(12) United States Patent
Barrier et al.

(10) Patent No.: US 10,013,611 B2
(45) Date of Patent: Jul. 3, 2018

(54) SYSTEM AND METHOD FOR PREPARING AN AERIAL HYDROLOGICAL-ASSAY FOR GOLF COURSES

(71) Applicants: Timothy John Barrier, Oceanside, CA (US); Javier David Spyker, Tigard, OR (US); Aaron Douglas Crawford, Salem, OR (US)

(72) Inventors: Timothy John Barrier, Oceanside, CA (US); Javier David Spyker, Tigard, OR (US); Aaron Douglas Crawford, Salem, OR (US)

( * ) Notice: Subject to any disclaimer, the term of this patent is extended or adjusted under 35 U.S.C. 154(b) by 30 days.

(21) Appl. No.: 15/332,276

(22) Filed: Oct. 24, 2016

(65) Prior Publication Data

US 2018/0114062 A1 Apr. 26, 2018

(51) Int. Cl.
| | | |
|---|---|---|
| *G06K 9/00* | (2006.01) | |
| *B64C 39/02* | (2006.01) | |
| *B64D 47/08* | (2006.01) | |
| *G08G 5/00* | (2006.01) | |
| *G05D 1/00* | (2006.01) | |
| *A01G 25/16* | (2006.01) | |

(52) U.S. Cl.
CPC ....... *G06K 9/00651* (2013.01); *A01G 25/167* (2013.01); *B64C 39/024* (2013.01); *B64D 47/08* (2013.01); *G05D 1/0011* (2013.01); *G08G 5/0034* (2013.01); *B64C 2201/123* (2013.01)

(58) Field of Classification Search
CPC .............. G06K 9/00651; B64C 39/024; B64C 2201/123; G08G 5/0034; G05D 1/0011; B64D 47/08; A01G 25/167
USPC ........................................................... 701/2
See application file for complete search history.

(56) References Cited

U.S. PATENT DOCUMENTS

| | | | |
|---|---|---|---|
| 8,642,507 B1 | 2/2014 | Entry et al. | |
| 9,044,543 B2 | 6/2015 | Levien et al. | |
| 9,061,102 B2 | 6/2015 | Levien et al. | |
| 9,131,642 B2 | 9/2015 | Groeneveld | |
| 9,245,363 B2 | 1/2016 | Laine | |
| 9,453,795 B1 | 9/2016 | Loew et al. | |
| 9,740,208 B2 * | 8/2017 | Sugumaran | G05D 1/0219 |
| 2014/0081479 A1 * | 3/2014 | Vian | G06Q 10/06 701/2 |
| 2014/0083937 A1 | 3/2014 | Hsu | |
| 2014/0229392 A1 | 8/2014 | Hsu | |
| 2016/0255763 A1 * | 9/2016 | Canyon | A01B 79/005 |
| 2017/0038749 A1 * | 2/2017 | Mewes | G05B 19/042 |
| 2018/0068416 A1 * | 3/2018 | Chandra | B64C 39/024 |

\* cited by examiner

*Primary Examiner* — Brian P Sweeney
(74) *Attorney, Agent, or Firm* — Nydegger & Associates

(57) ABSTRACT

Systems and methods for performing an aerial hydrological-assay of a topographical site require the use of an Unmanned Aerial System (UAS) for collecting image data of the site. Included in a system for the present invention is a ground-based soil moisture sensor for collecting moisture data at the site. A computer is then used to combine the image data and the moisture data to create an assay report on hydrological conditions at the site. The assay report is used to implement a water conservation plan for the topographical site which efficiently and efficaciously controls water usage at the site.

16 Claims, 3 Drawing Sheets

SYSTEM AND METHOD FOR PREPARING AN AERIAL HYDROLOGICAL-ASSAY FOR GOLF COURSES

FIELD OF THE INVENTION

The present invention pertains generally to systems and methods for establishing long-term, conservation programs for selected topographical sites. More particularly, the present invention pertains to water conservation programs based on hydrological data that is remotely collected during an aerial hydrological-assay. The present invention is particularly, but not exclusively, useful for establishing water conservation programs to selected topographical sites which are based on a combined engineering assessment of image data, which is generated during an aerial surveying mission flown by an Unmanned Aerial System (UAS), and moisture data which is collected by ground-based moisture sensors.

BACKGROUND OF THE INVENTION

For environmental, commercial and political reasons, water conservation is an important consideration. Depending on numerous factors, such as just how much water is actually consumed for a particular purpose, water usage can vary substantially. In many instances, the cost of water usage can, and should, be controlled.

At a commercial level, the cost for water usage is typically established merely by monitoring the volume of water that is used. The volume of water that is used, however, will necessarily depend on actual requirements, which will be site specific. In particular, for irrigation purposes, how water usage is managed is an important issue. For discussion purposes, and with a specific consideration for irrigation systems, consider golf courses.

Each golf course is unique and it will have unique water requirements depending on the topographical and meteorological considerations of the particular golf course. Moreover, the vegetation on a particular golf course will also vary from course to course, and the vegetation will differ from location to location on the same golf course. Also, the different forms of vegetation will have different water requirements.

For the efficacy of an irrigation system, the water use requirements noted above need to be monitored individually, at each golf course (i.e. topographical site). With this in mind, an effective monitoring program must necessarily provide sufficient information to implement an effective watering schedule. The present invention recognizes that the basic information needed to be obtained during such a monitoring program can be effectively collected using periodic, low-level, aerial surveillance.

For the specific purpose of collecting hydrological data pertinent to a water conservation program at a particular topographical site, the mission requirements for an effective aerial survey mission will depend on two important aircraft capabilities. For one, the aircraft must be capable of precision operational flying at altitudes below 500 feet Above Ground Level (AGL). For another, the aircraft must have a flight endurance capability that will be at least one hour in duration. The present invention recognizes that an Unmanned Aerial System (UAS), such as a fixed wing drone or a rotary wing drone, will have these flight capabilities. In particular, the type of UAS that is needed for the present invention must be configurable for a low-level survey mission over a topographical site, when the site is extensive and uniquely irregular, such as a golf course. Based on payload and flight endurance capabilities, the UAS will preferably be a fixed wing drone.

In light of the above, it is an object of the present invention to provide a system and method for performing an aerial hydrological-assay of a selected topological site that employs a UAS with an onboard imaging unit for collecting hydrological data of surface conditions at the topographical site. Another object of the present invention is to provide a system and method for performing an aerial hydrological-assay of a selected topological site which converts hydrological data collected by a UAS into an assay report that can be used to establish a long-term, water conservation program for the topological site. Still another object of the present invention is to provide a system and method for performing an aerial hydrological-assay of a selected topological site which is easy to manufacture, is simple to use, and is comparatively cost effective.

SUMMARY OF THE INVENTION

In accordance with the present invention, a system for performing an aerial hydrological-assay of a selected topographical site requires combining remotely acquired aerial image data of the site, with soil moisture data taken directly from the site. In combination, the image data and the moisture data are engineered to create an assay report for the topographical site. Importantly, the assay report includes an assessment of hydrological conditions at the site which can then be used to establish a long-term, water conservation program for the topographical site. For disclosure purposes, a golf course is considered here as being exemplary of a typical topographical site of interest for the present invention.

An important component of the system of the present invention is an Unmanned Aerial System (UAS). As intended for the present invention, the UAS is flown along a customized route over the selected topographical site in accordance with a predetermined flight plan. For purposes of the present invention the Unmanned Aerial System (UAS) may be a rotary wing drone but, preferably, it will be a fixed wing drone. In either case, an autopilot is mounted onboard the UAS and the predetermined flight plan is downloaded into the autopilot to control the UAS. Preferably, this control is accomplished using Global Positioning Satellite (GPS) techniques. Additionally, a ground-based flight controller is provided for maneuvering the UAS during emergencies, such as collision avoidance, and for necessary operational assistance, such as take offs and landings.

An imaging unit is mounted on the UAS for the purpose of imaging a surface area of the topographical site. Specifically, this is done to generate image data for the surface area. In particular, it is important that the imaging unit be capable of creating Normalized Difference Vegetation Index (NDVI) images for the image data. While NDVI images can be created using a single, all-in-one, unit, it may happen that cost and operational considerations could indicate a preference for a two-camera unit. In this latter case, the imaging unit will include a first camera for collecting visible Red-Green-Blue (RGB) images, and a second camera for collecting Near Infrared (NIR) images. When these RGB images and NIR images are combined and engineered they create the NDVI images required for the present invention.

In addition to the components disclosed above, the system for the present invention also includes at least one soil moisture sensor. Preferably, the soil moisture sensor is hand-held and manually operated. In this configuration, it can be selectively positioned at various locations within the topographical site to collect moisture data for the surface area. It is to be appreciated, however, that a plurality of moisture sensors can be permanently positioned at predetermined locations around the topographical site. These permanently positioned sensors can then be used, either in conjunction with a hand-held sensor, or in lieu thereof.

A computer is also included in the system for combining the image data from the memory card and the moisture data from the soil moisture sensor. It is this combination that creates the assay report. In particular, the hydrological conditions on the surface area of the topographical site are presented in the assay report. As noted above, the assay report is then used to establish a long-term, water conservation program for the topographical site.

For an operation of the present invention the water conservation plan will typically be used by an irrigation control system. In this case, the topographical site is divided into a plurality of irrigation stations. The irrigation stations can then be individually or collectively operated by the irrigation control system in accordance with the assay report to implement the water conservation plan. In accordance with the present invention, the primary purpose of the irrigation control system is to limit excessive water usage, and thereby minimize operational costs at the topographical site.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
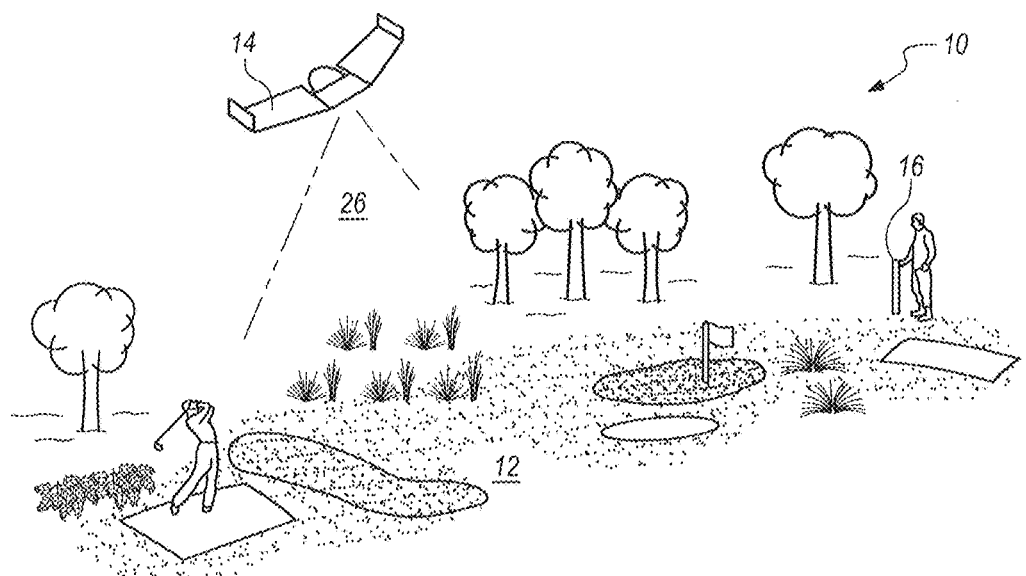
FIG. 1 is a presentation of a typical environment where image data and moisture data can be collected for use by the present invention.

Referring initially to FIG. 1, a system for performing an aerial hydrological-assay in accordance with the present invention is shown, and is generally designated 10. As shown in FIG. 1, the system 10 is intended for use on a topographical site 12 which may have uneven terrain, extend over a relatively large area, and include diverse types of vegetation. For example, a golf course. Operational components of the system 10 include an Unmanned Aerial System (UAS) 14 and a soil moisture sensor 16. As shown, the UAS 14 is provided to remotely collect image data of the topographical site 12, and the soil moisture sensor 16 is provided to take moisture data directly from the topographical site 12.

For purposes of the present invention, the UAS 14 is preferably a fixed wing drone that is capable of flying a predetermined flight plan along a customized route over the topographical site 12. For such a flight plan, the UAS 14 will typically require a flight endurance of approximately one hour, and it should be capable of carrying a payload that includes the necessary equipment for completion of its mission as disclosed below. Although, the indication given in FIG. 1 is that the soil moisture sensor 16 is portable and manually operable, it is also to be appreciated that permanent soil moisture sensors (not shown) can be prepositioned at selected locations in the topographical site 12 and used separately, or together with a portable soil moisture sensor 16.

Figure 2:
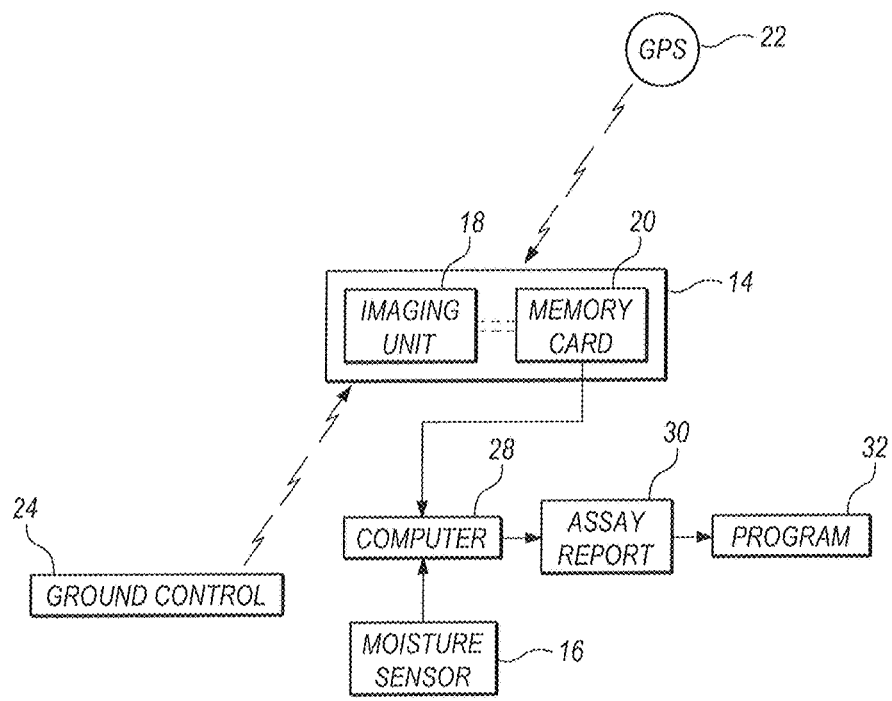
FIG. 2 is a schematic presentation of the operational components that are incorporated into the system of the present invention.

With reference to FIG. 2, it will be appreciated that a necessary payload for the UAS 14 will include an imaging unit 18 and a memory card 20. Further, FIG. 2 shows that a flight plan for the UAS 14 can be controlled either by GPS 22 or, alternatively, by a manually operated ground controller 24. In the case of control by GPS 22, the flight plan for the UAS 14 can be preprogrammed and downloaded into an autopilot (not shown) on the UAS 14. The ground controller 24 is provided specifically to override the GPS 22, for maneuvering the UAS 14 when deviations from the programmed flight plan are required, such as during emergencies for collision avoidance, and for necessary operational assistance, such as take offs and landings.

The imaging unit 18 of the system 10 is provided for collecting Normalized Difference Vegetation Index (NDVI) image data of the topographical site 12 during a survey mission. For this purpose, the imaging unit 18 includes a first camera (not shown) for collecting visible Red-Green-Blue (RGB) images, and a second camera (also not shown) for collecting Near Infrared (NIR) images. During the survey mission, both the RGB images and the NIR images will be collected by a camera(s) having a field of view 26 (see FIG. 1). As implied here, it is to be appreciated that the NDVI data can be collected using a single, all-in-one, camera unit. In either case, the NDVI data is collected and stored on the memory card 20 (e.g. a Secure Digital (SD) card) during its survey mission of the topographical site 12.

Using imaging techniques well known by skilled artisans in the art, the RGB images and the NIR images are combined and engineered to create the NDVI image data. As envisioned for the system 10 of the present invention, the NDVI image data can be created as a continuous sequence of overlapping, still photographic images, as a single image, or as an orthomosaic. FIG. 2 also indicates that the memory card 20 can be removed from the UAS 14 after the survey mission, and the NDVI image data on the memory card 20 can be transferred to a computer 28. As will be appreciated by those skilled in the art, the NDVI image data presents a moisture percentage for portions of the topographical site 12 in the image area on a scale from −1 to 1, wherein 0 is a total lack of vegetation and 1 represents the healthiest, most vigorous vegetation.

Still referring to FIG. 2, it will be seen, and appreciated, that moisture data from the moisture sensor 16 is transferred to the computer 28, along with the NDVI image data. The computer 28 is then employed to combine the NDVI image data from the memory card 20, with the moisture data from the soil moisture sensor 16. Specifically, the soil moisture measurements are combined with the NDVI imagery to compare the health of the plant (NDVI value) with the soil moisture content to determine a target soil moisture percentage. In particular, this combination of image data and moisture data is engineered to create an assay report 30.

As intended for the present invention, the assay report 30 will include hydrological conditions on the surface area of the topographical site 12 that are presented as a plan view of the topographical site 12. In particular, the plan view image of the assay report 30 is engineered to identify portions of the surface which contain excess water. The assay report 30 is then used to establish a long-term, water conservation program 32 for the topographical site 12.

Figure 3A:
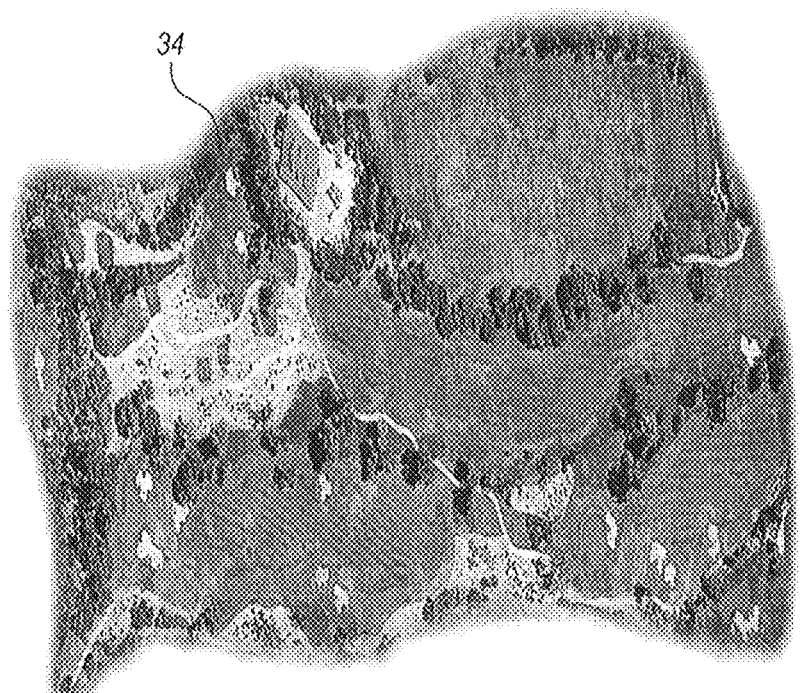
FIG. 3A is a top plan view of a topographical site shown as a visual Red-Green-Blue image taken during an aerial survey mission that is conducted in accordance with the present invention.
Figure 3B:
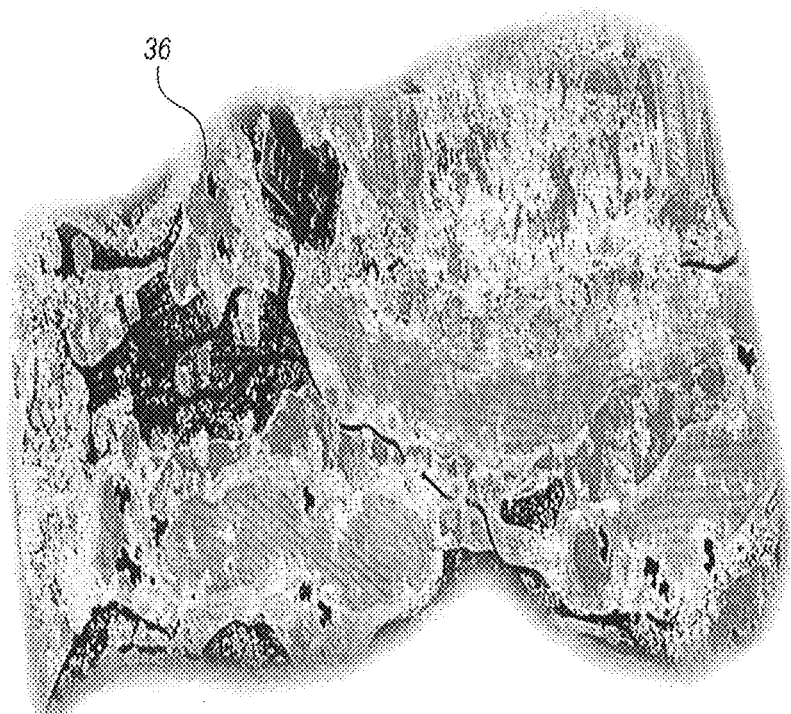
FIG. 3B is the top plan view of FIG. 3A after the RGB visual image has been engineered with Near Infrared (NIR) imagery for presentation as Normalized Difference Vegetation Index (NDVI) images which can be used to prepare an assay report.

With reference to FIGS. 3A and 3B, as envisioned for the present invention the image data collected by the imaging unit 18 will be used to construct an RGB plan view 34 of the topographical site 12 (see FIG. 3A). The RGB plan view 34 will then be engineered with Near Infrared imagery, also collected by the imaging unit 18, to create an NDVI plan view 36 (see FIG. 3B). It is this NDVI plan view 36 that is engineered with moisture data from the soil moisture sensor 16 by the computer 28 to create the assay report 30. As shown in FIG. 2, the assay report 30 is then used to establish a water conservation program 32 for the topographical site 12.

Figure 4:
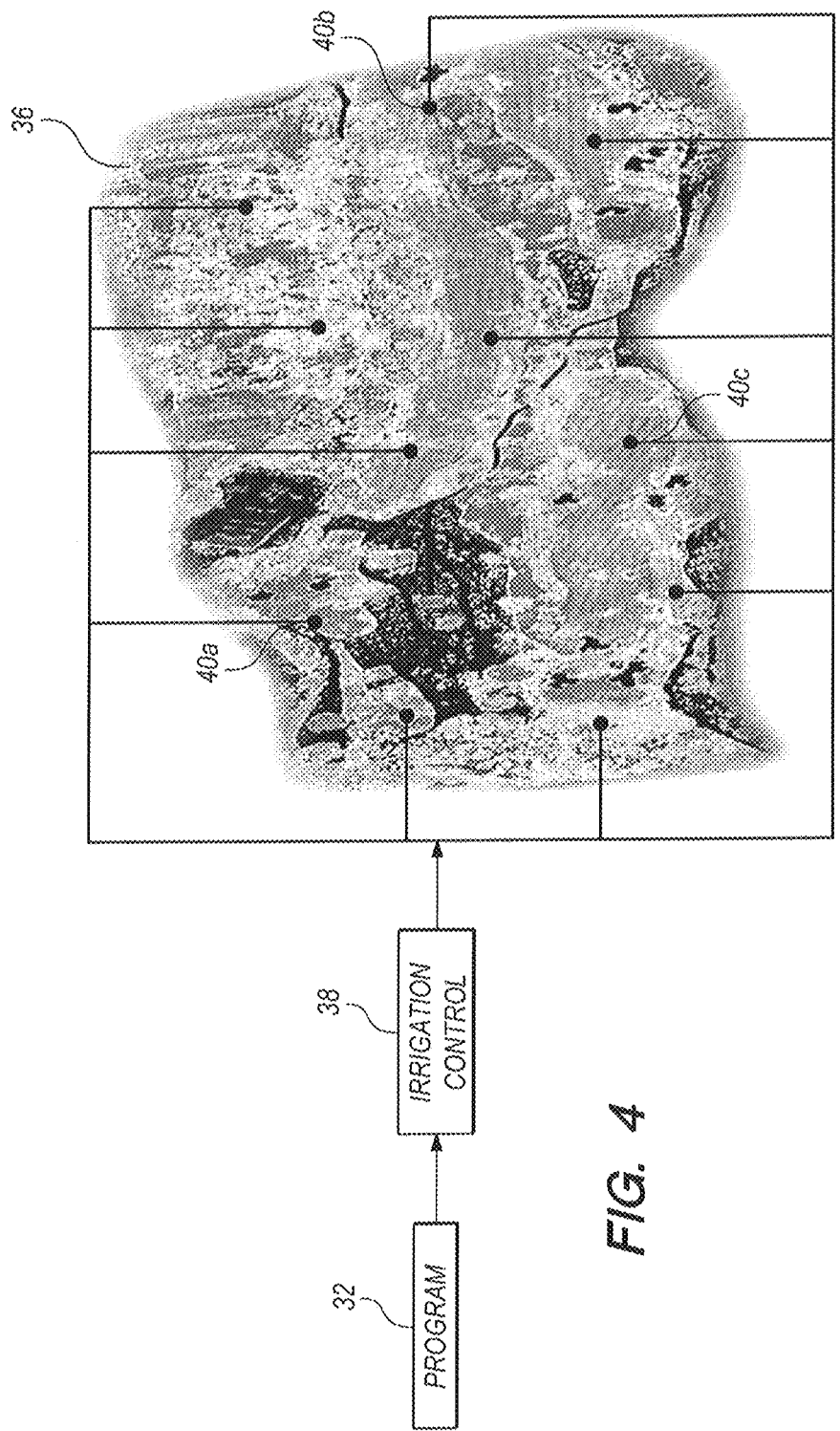
FIG. 4 is a schematic presentation of an irrigation system for implementing a water conservation program, which is based on the assay report that is prepared for the present invention.

As indicated in FIG. 4, for an operation of the water conservation program 32, the system 10 includes an irrigation control system 38. In detail, for the irrigation control system 38, the topographical site 12 is divided into a plurality of irrigation stations 40, of which the irrigation stations 40a, 40b and 40c that are identified in FIG. 4 are only exemplary. For the present invention, the irrigation stations 40 are intended to be individually and/or collectively operated by the irrigation control system 38 in accordance with the assay report 30 to implement the water conservation program 32.

While the particular System and Method for Preparing an Aerial Hydrological-Assay for Golf Courses as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for performing an aerial hydrological-assay of a selected topographical site which comprises:
   an Unmanned Aerial System (UAS) for flying a survey mission along a customized route over the selected topographical site in accordance with a predetermined flight plan;
   an imaging unit mounted on the UAS for imaging a surface area of the topographical site, to generate image data for the surface area, wherein the image data is selected from the group consisting of a continuous sequence of overlapping, still photographic images and an orthomosaic;
   a memory card connected to the imaging unit onboard the UAS for recording and storing the image data collected during the survey mission;
   at least one soil moisture sensor selectively positioned at a predetermined location within the topographical site to collect moisture data for the surface area; and
   a computer for combining the image data from the memory card with the moisture data from the soil moisture sensor to create an assay report including hydrological conditions on the surface area of the topographical site, wherein the assay report is used to establish a long-term, water conservation program for the topographical site.

2. The system recited in claim 1 further comprising an irrigation control system wherein the topographical site is divided into a plurality of irrigation stations, and wherein the irrigation stations are individually and collectively operated by the irrigation control system in accordance with the assay report to implement the water conservation program.

3. The system recited in claim 1 wherein the imaging unit comprises:
   a first camera for collecting visible Red-Green-Blue (RGB) images; and
   a second camera for collecting Near Infrared (NIR) images, wherein the RGB images and the NIR images are combined and engineered to create Normalized Difference Vegetation Index (NDVI) images for the image data.

4. The system recited in claim 3 wherein the assay report includes a composite of the NDVI images, wherein the composite is presented as a plan view of the topographical site, and wherein the plan view image is engineered to identify portions of the surface area containing excess water.

5. The system recited in claim 1 wherein the UAS is controlled using Global Positioning Satellite (GPS) techniques for the predetermined flight plan.

6. The system recited in claim 5, further comprising a remote, ground-based flight controller for maneuvering the UAS during the survey mission for collision avoidance and operational assistance.

7. The system recited in claim 1 further comprising:
   an autopilot mounted onboard the UAS, wherein the predetermined flight plan is downloaded into the autopilot to control the UAS using Global Positioning Satellite (GPS) techniques; and
   a remote, ground-based flight controller for maneuvering the UAS during the survey mission for collision avoidance and operational assistance.

8. The system recited in claim 1 wherein the topographical site is selected from the group consisting of a golf course, a sports turf course, and an athletic field.

9. The system recited in claim 1 wherein the Unmanned Aerial System (UAS) is selected from the group consisting of a fixed wing drone and a rotary wing drone.

10. The system recited in claim 1 wherein the memory card is a Secure Digital (SD) card.

11. A system for performing an aerial hydrological-assay of a selected topographical site which comprises:
    a means for flying an Unmanned Aerial System (UAS) on a survey mission over the selected topographical site in accordance with a predetermined flight plan;
    an imaging unit for generating image data during the survey mission for a surface area of the topographical site, wherein the imaging unit is mounted on the UAS and includes a memory card for recording and storing the image data collected during the survey mission and wherein the imaging unit includes a first camera for collecting visible Red-Green-Blue (RGB) images, and a second camera for collecting Near Infrared (NIR) images, wherein the RGB images and the NIR images are combined and engineered to create Normalized Difference Vegetation Index (NDVI) images for the image data;
    at least one soil moisture sensor for collecting moisture data from the surface area wherein the moisture sensor is selectively positioned at locations within the topographical site to collect and record moisture data for the surface area; and a means for creating an assay report, wherein the creating means uses the image data from the memory card and the moisture data to describe hydrological conditions on the surface area of the topographical site, and wherein the assay report is used to establish a long-term, water conservation program for the topographical site.

12. The system recited in claim 11 wherein the means for flying the UAS comprises:

an autopilot mounted onboard the UAS, wherein the predetermined flight plan is downloaded into the autopilot to control the UAS using Global Positioning Satellite (GPS) techniques; and a remote, ground-based flight controller for maneuvering the UAS during the survey mission for collision avoidance and operational assistance.

13. The system recited in claim 11 wherein the means for creating an assay report comprises a computer for combining the image data from the memory card with the moisture data from the soil moisture sensor to create an assay report including hydrological conditions on the surface area of the topographical site, wherein the assay report is used to establish a long-term, water conservation program for the topographical site.

14. The system recited in claim 11 wherein the assay report includes a composite of the NDVI images, wherein the composite is presented as a plan view of the topographical site, and wherein the plan view image is engineered to identify portions of the surface area containing excess water.

15. A method for performing an aerial hydrological-assay of a selected topographical site for use in implementing a water conservation program which comprises the steps of:

using a soil moisture sensor at locations on a surface area within the topographical site to collect moisture data;

providing an Unmanned Aerial System (UAS) for flying a survey mission in accordance with a predetermined flight plan, within a specified flight envelope;

mounting an imaging unit on the UAS for imaging a surface area of the topographical site;

connecting a memory card to the imaging unit for recording and storing images collected by the imaging unit during the survey mission;

flying the UAS over the selected topographical site to perform the survey mission;

generating image data for the topographical site during the survey mission, wherein the image data includes a photographic image of the surface area taken by the imaging unit and stored on the memory card;

disconnecting the memory card from the imaging unit;

downloading the image data from the memory card and the moisture data onto a computer, wherein the computer creates an assay report of hydrological conditions on the surface area of the topographical site;

printing the assay report for use in establishing a long-term, water conservation program for the topographical site;

collecting visible Red-Green-Blue (RGB) images and Near Infrared (NIR) images using the imaging unit;

combining the RGB images and the NIR images to create Normalized Difference Vegetation Index (NDVI) images, wherein the NDVI images include soil moisture percentage readings for the image data;

presenting a composite of the NDVI images as a plan view of the topographical site; and engineering the plan view image of the topographical site to identify portions of the surface area containing excess water.

16. The method recited in claim 15 further comprising the steps of:

providing an irrigation control system;

dividing the topographical site into a plurality of irrigation stations, wherein the irrigation stations are individually and collectively operated by the irrigation control system; and operating the irrigation control system in accordance with the assay report to implement the water conservation plan.

* * * * *